(12) United States Patent
Webster et al.

(10) Patent No.: US 6,973,296 B2
(45) Date of Patent: Dec. 6, 2005

(54) SOFT DECISION GAIN COMPENSATION FOR RECEIVE FILTER ATTENUATION

(75) Inventors: Mark A. Webster, Indian Harbour Beach, FL (US); Paul J. Chiuchiolo, Melbourne, FL (US); Albert L. Garrett, Melbourne, FL (US)

(73) Assignee: Intersil Americas Inc., Irvine, CA (US)

( * ) Notice: Subject to any disclaimer, the term of this patent is extended or adjusted under 35 U.S.C. 154(b) by 714 days.

(21) Appl. No.: 10/011,794

(22) Filed: Dec. 4, 2001

(65) Prior Publication Data

US 2003/0104797 A1 Jun. 5, 2003

(51) Int. Cl.$^7$ ................................................ H04B 1/10
(52) U.S. Cl. ...................... 455/296; 455/130; 455/283; 455/285
(58) Field of Search ................................. 455/296, 302, 455/278.1, 130, 63.1, 283, 295, 317, 501, 285; 375/229, 346, 350, 284, 285

(56) References Cited

U.S. PATENT DOCUMENTS

| | | | | |
|---|---|---|---|---|
| 4,873,683 A | * | 10/1989 | Borth et al. | ................ 370/337 |
| 5,121,391 A | | 6/1992 | Paneth et al. | |
| 6,115,435 A | * | 9/2000 | Harada et al. | ............... 375/341 |
| 6,259,729 B1 | * | 7/2001 | Seki | ........................... 375/231 |
| 6,301,315 B1 | * | 10/2001 | Li | ............................... 375/346 |
| 6,536,010 B1 | * | 3/2003 | Brink | .......................... 714/794 |
| 6,662,337 B1 | * | 12/2003 | Brink | .......................... 714/792 |
| 2003/0081703 A1 | * | 5/2003 | Kawaguchi et al. | ......... 375/343 |

FOREIGN PATENT DOCUMENTS

| EP | 0 771 079 A | 5/1997 |
|---|---|---|
| EP | 1 213 852 A | 6/2002 |

OTHER PUBLICATIONS

PCT Notification of Transmittal of International Preliminary Examination Report, dated Oct. 23, 2003, 4 pages.
PCT Notification of Transmittal of the International Search Report or the Declaration dated Apr. 4, 2003, 5 pages.

* cited by examiner

*Primary Examiner*—Sonny Trinh
(74) *Attorney, Agent, or Firm*—Hunton & Williams LLP

(57) ABSTRACT

A wireless receiver including a receive chain, a synchronization processor, a memory, a combiner and a soft decision processor. The synchronization processor determines a frequency response of the wireless channel using synchronization data transmitted in the wireless channel. The memory stores a compensation vector indicative of a frequency response of receive chain filtering. The combiner combines the compensation vector with the wireless channel frequency response to provide a compensated frequency response. The soft decision processor uses the compensated frequency response to evaluate data decisions. The compensation vector is based on measurement or estimation of the frequency response of the receive chain. The combiner may be based on multiplication or addition. The wireless receiver may include an FEQ. The synchronization processor generates FEQ coefficients for programming the FEQ taps. The FEQ provides an equalized data value and a compensated frequency response value to the soft decision processor for each sub-carrier.

23 Claims, 6 Drawing Sheets

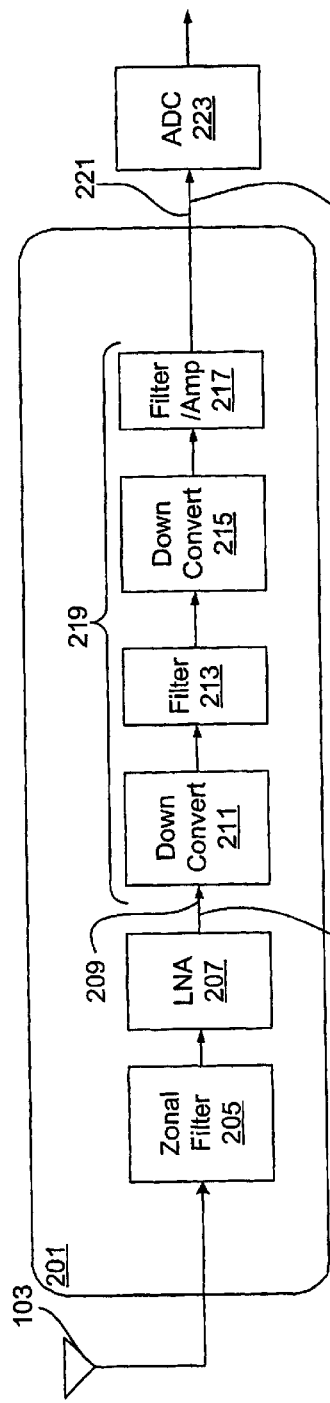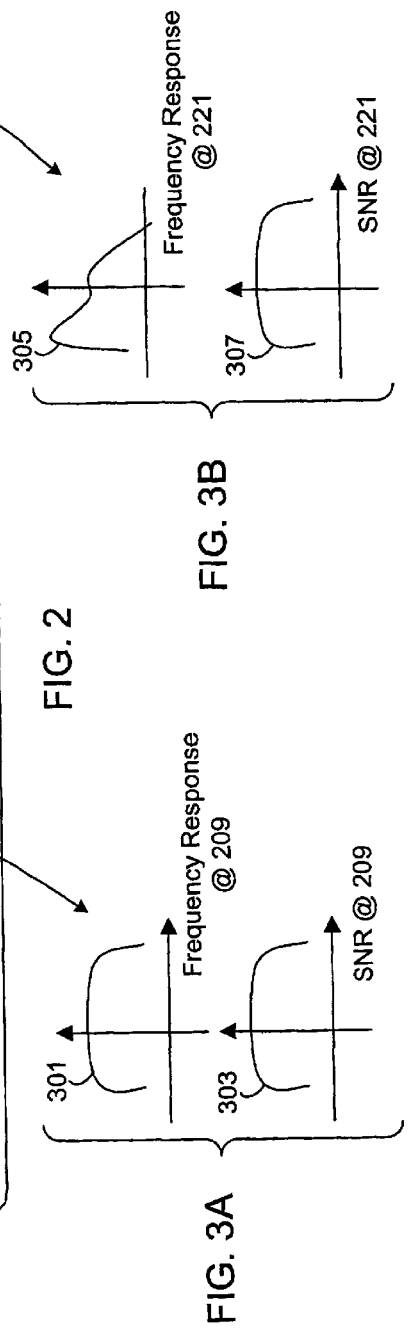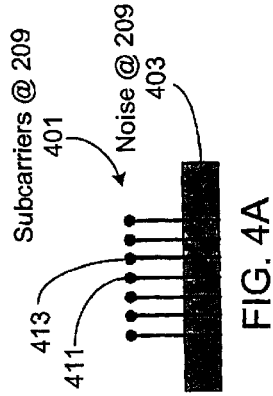

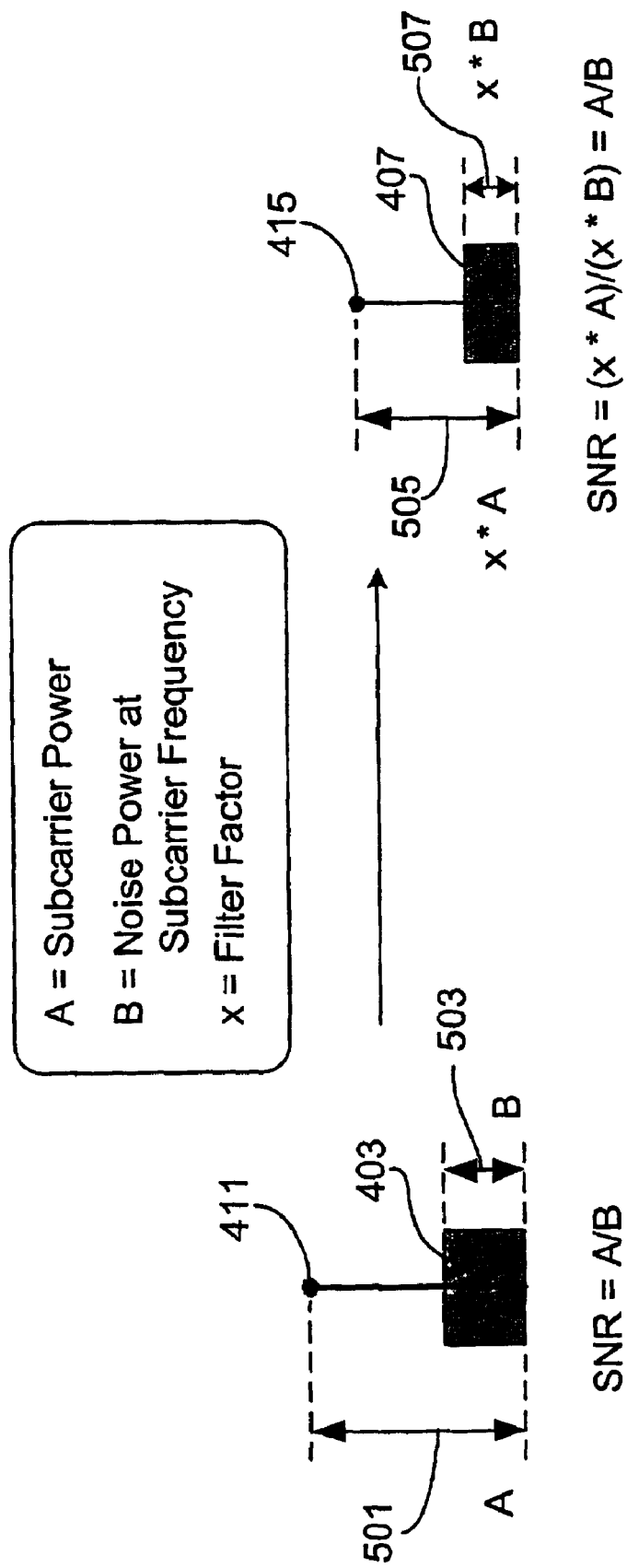

SOFT DECISION GAIN COMPENSATION FOR RECEIVE FILTER ATTENUATION

FIELD OF THE INVENTION

The present invention relates to wireless communications, and more particularly to soft-decision gain compensation to remove filter-induced bias in a wireless receiver.

DESCRIPTION OF RELATED ART

Filtering after the Low-Noise Amplifier (LNA) of a wireless receiver changes the frequency response of the receive spectrum. Existing soft decision processors have been designed in accordance with an assumption that noise power across the bandwidth is flat and thus interpret filter attenuation as a reduction in the Signal-to-Noise Ratio (SNR). For example, a sub-carrier in an OFDM-based system attenuated by receive circuitry filtering will be considered less reliable by soft decision and Viterbi processing regardless of the SNR of that sub-carrier. The filtering after the LNA, however, makes the "flat" assumption false in that the sub-carriers and noise are similarly attentuated by receive filtering such that SNR is not necessarily reduced. In this manner, the noise power assumption used by subsequent processing is not correct so that processing performance is compromised.

SUMMARY OF THE INVENTION

The present invention applies to a wireless receiver that receives radio frequency (RF) signals via a wireless channel in which data is transmitted using a plurality of sub-carriers. A wireless receiver according to an embodiment of the present invention includes a receive chain, a synchronization processor, a memory, a combiner and a soft decision processor. The synchronization processor determines a frequency response of the wireless channel using synchronization data that was transmitted in the wireless channel. The memory stores a compensation vector indicative of a frequency response of the receive chain. The combiner combines the compensation vector with the wireless channel frequency response to provide a compensated frequency response. The soft decision processor uses the compensated frequency response to evaluate data decisions. In this manner, it is appreciated that the soft decision processor makes data decisions using a frequency response that is compensated for receive chain filtering. Therefore, the soft decisions are more accurate resulting in a more robust design.

The receive chain may include a plurality of filtering circuits that collectively have a variant frequency response and a relatively flat signal to noise ratio (SNR). The compensation vector may be based on a measurement of the variant frequency response of the receive chain. Alternatively, the compensation vector is based on an estimation of the variant frequency response of the receive chain. The compensation vector may be based on a compensation curve derived from the variant frequency response of the receive chain. In any case, the compensation vector corrects for variations in the variant frequency response of the receive chain across the plurality of sub-carriers.

The compensation vector may include a plurality of compensation factors where the combiner includes a set of multipliers. In this manner, a compensation factor is multiplied by a corresponding frequency response value to obtain a compensated frequency response value. Alternatively, the compensation vector may include a plurality of compensation offsets and the combiner includes adders. In this case, a compensation offset is added to (or subtracted from) a corresponding frequency response value to obtain a compensated frequency response value.

The wireless receiver may include a frequency domain equalizer (FEQ) that has programmable taps for equalizing each of the plurality of sub-carriers in an attempt to remove phase and amplitude variations. The FEQ receives compensated frequency response values and provides to the soft decision processor an equalized data value and a corresponding compensated frequency response value for each sub-carrier. The synchronization processor generates FEQ coefficients that are used to program the taps of the FEQ and generates receive chain frequency response values that are provided to the combiner. The combiner receives the receive chain frequency response values and provides corresponding compensated frequency response values to the FEQ.

An RF transceiver for communicating via a wireless channel according to an embodiment of the present invention includes an antenna, a radio and a Baseband processor. The radio includes receive chain circuitry coupled to the antenna that converts received RF packets into Baseband information. The Baseband processor includes a receive processor that processes the Baseband information, where the receive processor includes a synchronization processor, memory, a combiner and a soft decision processor. The synchronization processor determines a plurality of frequency response values using synchronization data transmitted via the wireless channel. The memory stores a plurality of compensation values indicative of a frequency response of the receive chain circuitry. The combiner modifies the plurality of frequency response values using the plurality of compensation values to provide a plurality of compensated frequency response values. The soft decision processor uses the plurality of compensated frequency response values to evaluate decisions of corresponding data values.

The RF transceiver may include any of the variations described above for the wireless receiver. In further embodiments, the RF transceiver includes an analog to digital converter (ADC) that converts the Baseband information from analog to digital format for processing by the receive processor. The receive processor includes a frequency transform converter and an FEQ. The frequency transform converter converts time domain Baseband digital information into frequency domain Baseband digital information. The FEQ has programmable taps for equalizing the frequency domain Baseband digital information in an attempt to remove phase and amplitude variations for each of a plurality of sub-carriers. The FEQ receives the plurality of compensated frequency response values and provides to the soft decision processor an equalized data value and a corresponding compensated frequency response value for each of the plurality of sub-carriers. The synchronization processor generates FEQ coefficients used to program the taps of the FEQ and generates receive chain circuitry frequency response values that are provided to the combiner. The combiner receives the receive chain frequency response values and provides corresponding compensated frequency response values to the FEQ.

The synchronization processor of the RF transceiver may further include a frequency offset estimator, a gain adjust circuit and an FEQ initializer. The frequency offset estimator determines phase adjustment and asserts phase adjustment signals indicative thereof. The gain adjust circuit compares the synchronization data with a target gain signal and asserts gain adjustment signals indicative thereof. The FEQ initializer employs a selected constellation and receives the phase adjustment signals and the gain adjustment signals to provide the FEQ coefficients in an attempt to remove rotation and correct amplitude variations caused by the wireless channel. The FEQ initializer further determines a frequency response of the wireless channel and provides the plurality of frequency response values indicative thereof.

The present invention also contemplates a method of compensating channel state information (CSI) for a wireless receiver. The wireless receiver receives RF signals via a wireless channel in which data is incorporated on a plurality of sub-carriers and in which the receiver employs soft decision processing. The method includes determining a frequency response of the wireless channel based on synchronization data transmitted in the wireless channel, modifying the frequency response by a compensation vector indicative of filtering of the receive chain to provide a corresponding compensated frequency response, processing data received from the wireless channel through the receive chain to provide estimated data values, and determining quality of data value decisions based on the compensated frequency response values.

The method may further include measuring a frequency response of the receive chain, inverting the measured frequency response, and determining the compensation vector based on the inverted frequency response. Alternatively, the method may include approximating a frequency response of the receive chain, inverting the approximated frequency response, and determining the compensation vector based on the inverted frequency response.

The compensation vector may include a plurality of compensation factors and the frequency response may include a plurality of frequency response values. In this case, the method includes multiplying each of the compensation factors by a corresponding one of the frequency response values. Alternatively, the compensation vector includes a plurality of compensation offsets, where the method includes adding each of the compensation offsets by a corresponding one of the frequency response values.

The method may further include determining FEQ coefficients using the synchronization data, programming an FEQ based on the FEQ coefficients, processing data from the receive chain through the FEQ to provide equalized data values, and making data value decisions based on the equalized data values. The data value decisions are qualified by the compensated frequency response values.

BRIEF DESCRIPTION OF THE DRAWINGS

A better understanding of the present invention can be obtained when the following detailed description of the preferred embodiment is considered in conjunction with the following drawings, in which:

FIG. 2 is a block diagram of an exemplary configuration of the RX chain of FIG. 1 illustrating receive chain filtering.

FIG. 3A includes a pair of graph diagrams showing a frequency response plot and a signal to noise ratio (SNR) plot, respectively, over the frequency range of the sub-carriers at the output of the LNA of FIG. 2.

FIG. 3B includes a pair of graph diagrams illustrating a frequency response plot and an SNR plot, respectively, over the frequency range of the sub-carriers at the input of the ADC of FIG. 2.

FIG. 4A is a figurative graph diagram plotting individual sub-carrier power signals and a noise power signal over the frequency range of the sub-carriers at the output of the LNA of FIG. 2.

FIG. 4B is a figurative graph diagram plotting individual sub-carrier power signals and noise power signal over the frequency range of the sub-carriers at the input of the ADC of FIG. 2.

FIG. 5A is a figurative graph diagram of the sub-carrier power signal and the noise power signal over the applicable frequency range at the output of the LNA of FIG. 2.

FIG. 5B is a figurative graph diagram of the sub-carrier power signal and the noise power signal over the applicable frequency range at the input of the ADC of FIG. 2.

DETAILED DESCRIPTION OF EMBODIMENT (S) OF THE INVENTION

Figure 1:
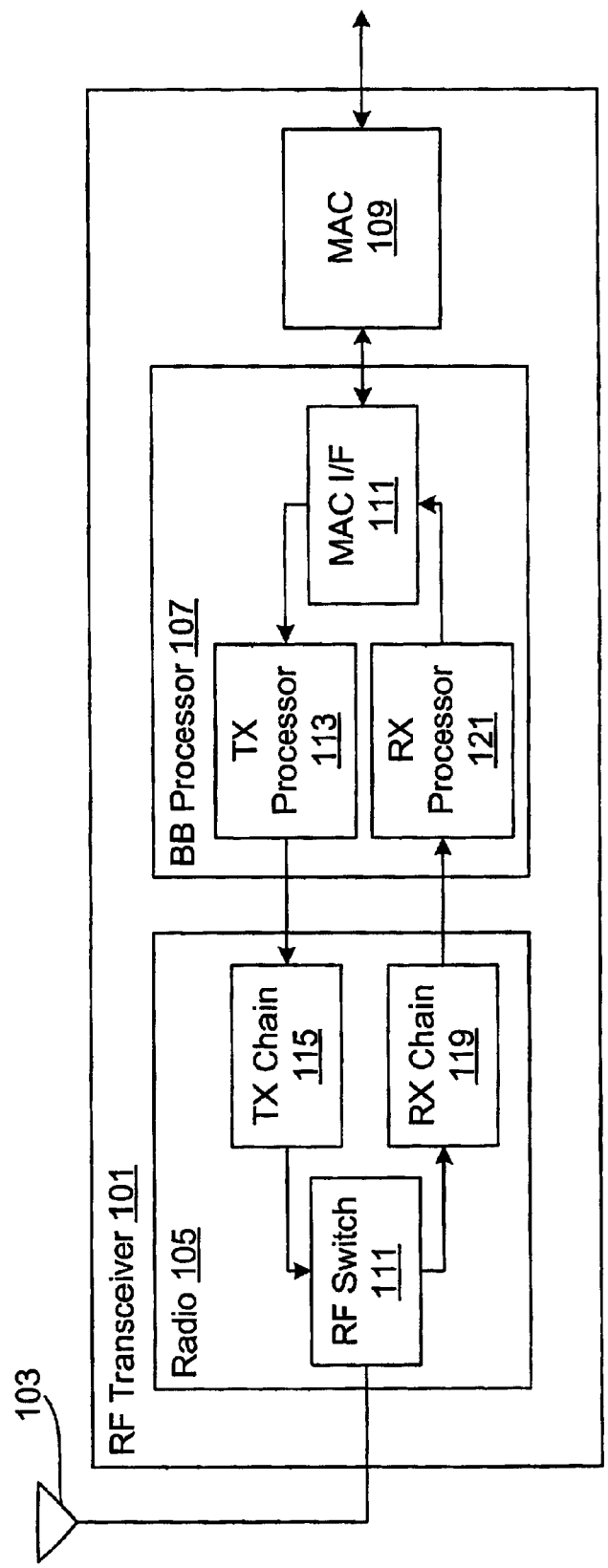
FIG. 1 is a block diagram of a wireless radio frequency (RF) transceiver implemented according to an embodiment of the present invention.

FIG. 1 is a block diagram of a wireless radio frequency (RF) transceiver 101 implemented according to an embodiment of the present invention. The RF transceiver 101 may be used to communicate with one or more similar wireless devices across a wireless medium, such as within a wireless local area network (WLAN) or the like. Although the present invention is illustrated for use in a WLAN device in exemplary embodiments, it is understood that the present invention applies to any radio or wireless communication device and is not limited to WLAN applications. The RF transceiver 101 may be used by any type of device to incorporate wireless communication capabilities, such as a wireless access point (AP), any type of computer or computer system (e.g., personal computers, laptop computers, desktop computers, etc.,), printing devices including any type of printer technology, personal digital assistants (PDAs) or the like, scanners, fax machines, etc. The RF transceiver 101 may be configured as a plug-in peripheral or expansion card that plugs into an appropriate slot or interface of a computer system, such as a Personal Computer Memory Card International Association (PCMCIA) card or PC Card or may be implemented according to any type of expansion or peripheral standard, such as according to the peripheral component interconnect (PCI), the Industry Standard Architecture (ISA), the Extended-ISA (EISA) standard, etc. Mini PCI cards with antennas embedded in displays are also contemplated. Self-contained or standalone packaging with appropriate communication interface(s) is also contemplated, which is particularly advantageous for APs. The RF transceiver 101 may be implemented as a separate unit with serial or parallel connections, such as a Universal Serial Bus (USB) connection or an Ethernet interface (twisted-pair, coaxial cable, etc.), or any other suitable interface to the device. Other types of wireless devices are contemplated, such as any type of wireless telephony device including cellular phones.

The RF transceiver 101 communicates via the wireless medium using one or more antennas 103 coupled to an internal radio chip or device 105. The radio 105 is coupled to a Baseband (BB) processor 107 and generally converts between RF signals and Baseband signals. The Baseband processor 107 is further coupled to a medium access control (MAC) device 109 that communicates with the underlying device or system. Digital data sent from or received by the RF transceiver 101 is processed through the MAC 109. For transmission, the MAC 109 asserts digital data signals via a MAC interface (I/F) 111 to a transmission (TX) processor 113, which formulates data into packets for transmission. The digital packet information is converted to analog signals using a digital to analog converter (DAC) (not shown) and processed by a TX chain 115 for converting the packets into RF signals suitable for transmission via the antenna 103. An RF switch 117 selects the TX chain 115 for transmission and an RF chain 119 for reception of packets. The RX chain 119 extracts Baseband signals from a received RF signal and provides the Baseband signals to a receive (RX) processor 121 via an analog to digital converter (ADC) 223 (FIG. 2). The RX processor 121 generally performs the inverse functions of the TX processor 113 to extract data from received packets into data signals for the underlying device. The data is forwarded to the MAC 109 via the MAC I/F 111 as shown.

The RF transceiver 101 may be implemented according to the Institute of Electrical and Electronics Engineers, Inc. (IEEE) 802.11a standard operating at approximately 5 Gigahertz (GHz) for use with a WLAN. The IEEE 802.11a standard defines data rates of 6, 9, 12, 18, 24, 36, 48 and 54 megabits per second (Mbps) in the 5 GHz band employing orthogonal frequency division multiplexing (OFDM). OFDM is a multi-carrier modulation technique in which data is carried on a plurality of "tones" or "sub-carriers" associated with a multi-carrier signal. In the OFDM embodiment, communication is established using packets of information including one or more synchronization data fields followed by a plurality of OFDM symbols. In an OFDM configuration, 52 sub-carrier signals are incorporated within each OFDM symbol, including 48 data tones and 4 pilot tones as known to those skilled in the art. Data is incorporated on each data tone using a selected modulation scheme, such as binary phase shift keying (BPSK), Quadrature PSK (QPSK), 16 Quadrature Amplitude Modulation (QAM), and 64 QAM. Each of the modulation schemes employs a corresponding constellation with two, four, 16 or 64 constellation points, respectively. The data rate is determined by the modulation scheme used for data. For example, BPSK is used for 6 or 9 Mbps, QPSK is used for 12 or 18 Mbps, 16 QAM is used for 24 or 36 Mbps, and 64 QAM is used for 48 or 54 Mbps. It is appreciated, however, that the teachings of the present invention may be applied in the same or similar manner to other types of wireless communication in which data is transmitted using a plurality of sub-carriers distributed in frequency and communicated via a selected RF band.

FIG. 2 is a block diagram of an exemplary configuration 201 of the RX chain 119 illustrating receive chain filtering. Input radio signals are detected by the antenna 103 and provided to a Low-Noise Amplifier (LNA) 207 via a Zonal filter 205. Several details and components may be included although not shown, such as multiple antennas and a diversity switch, band pass filters (BPF), etc. The LNA 207 may be a dual mode amplifier in which the signal is either passed without amplification or amplified by a relatively high gain (e.g. 22 decibels (dB)) for detecting weak RF signals. The output of the LNA 207, shown at 209, is provided to the input of a down converter 211, which may include one or more band pass filters, an RF oscillator tuned to the carrier frequency of interest (e.g., ~5 MHz), and one or more mixers (not shown) as known to those skilled in the art. The down converter 211 generally operates to remove the RF carrier signal and convert the input signal to an intermediate frequency (IF) signal. The down converter 211 may also divide the input signal into in-phase (I) and quadrature phase (Q) components if necessary. The output of the down converter 211 is provided to another down converter 215 via a filter 213 (e.g., another BPF or the like). The down converter 215 generally operates to convert the IF signal into Baseband signals, and may include additional filters, amplifiers, mixers, oscillators, etc. (not shown). The output of the down converter 215 is provided to a filter/amplifier circuit 217, which provides its output to the ADC 223. The filter/amplifier circuit 217 includes one or more low-pass filters (LPFs) and high-pass filters (HPF) as well as additional amplifiers as desired. A variable amplifier stage (not shown) may be provided within the filter/amplifier circuit 217 to control the power level of the input signal to a target power level.

The ADC 223 converts the received and processed analog input signals into Baseband digital signals for further processing by the baseband processor 107 for acquiring the data and/or information incorporated in the received signal. The down converters 211, 215 and the filter and/or amplifier stages 213, 217 are generally referred to as receive chain filtering 219 between the output 209 of the LNA 207 and an input 221 of the ADC 223.

FIG. 3A includes a pair of graph diagrams showing a frequency response plot 301 and a signal to noise ratio (SNR) plot 303, respectively, over the frequency range of the sub-carriers at the output 209 of the LNA 207. The simplified plots of the frequency response and the SNR are generally flat indicating that the frequency response and SNR do not change appreciably for the sub-carriers.

FIG. 3B includes a pair of graph diagrams illustrating a frequency response plot 305 and an SNR plot 307, respectively, over the frequency range of the sub-carriers at the input 221 of the ADC 223. As shown, the SNR remains relatively flat through the receive chain filtering 219. The frequency response, however, varies appreciably. In this manner, the receive chain filtering 219 does not significantly affect the SNR of the input signal, but does significantly affect the power of the input signal over the applicable frequency range.

FIG. 4A is a figurative graph diagram plotting individual sub-carrier power signals 401 and a noise power signal 403 over the frequency range of the sub-carriers at the output 209 of the LNA 207. Since the frequency response is relatively flat, the sub-carrier power signals 401 and the noise power signal 403 are substantially flat at the output 209 of the LNA 207.

FIG. 4B is a figurative graph diagram plotting individual sub-carrier power signals 405 and noise power signal 407 over the frequency range of the sub-carriers at the input 221 of the ADC 223. In this simplified example, two of the sub-carriers power signals 415 and 417 (fourth and fifth sub-carrier power signals, respectively) of the sub-carrier power signals 405 correspond to sub-carriers power signals 411 and 413, respectively, at the output 209 of the LNA 207. It is noted that the sub-carrier power signals 405 and noise power signal 407 do not necessarily correspond to the frequency response plot 305 shown. The sub-carriers power signals 415 and 417 of the sub-carrier power signals 405 at the input 221 of the ADC 223 are shown as attenuated as compared to the other sub-carrier power signals 405 and as compared to the corresponding sub-carriers power signals 411 and 413, respectively, at the output 209 of the LNA 207. Such attenuation is a direct result of the frequency response of the receive chain filtering 219. It is noted, however, that the noise power signal 407 at the input 221 of the ADC 223 and at the frequencies of the sub-carriers power signals 415 and 417 exhibits a similar ripple effect caused by the receive chain filtering 219 as shown at 409. It is appreciated that since the SNR remains relatively flat at the input 221 of the ADC 223 as shown by the SNR plot 307, the integrity of the sub-carriers power signals 415 and 417 is the same or similar as the other sub-carrier power signals 405. In general, the frequency response of the receive chain filtering 219 affects the input sub-carrier power signals 401 and the noise power signal 403 by approximately the same amount.

FIG. 5A is a figurative graph diagram of the sub-carrier power signal 411 and the noise power signal 403 over the applicable frequency range at the output 209 of the LNA 207. The power level 501 of the sub-carrier signal 411 is shown as "A" and the power level 503 of the noise power signal 403 is shown as "B". The SNR of the sub-carrier power signal 411 is calculated as A/B, where "/" denotes division.

FIG. 5B is a figurative graph diagram of the sub-carrier power signal 415 and the noise power signal 407 over the applicable frequency range at the input 221 of the ADC 223. As described previously, the sub-carrier power signal 415 corresponds to the sub-carrier power signal 411. The power level 505 of the sub-carrier power signal 415 is shown as "x*A" and the power level 507 of the noise power signal 407 is shown as "x*B", where "x" denotes a filter factor of the receive chain filtering 219 and where the asterisk "*" denotes multiplication. The SNR of the sub-carrier power signal 415 is calculated as (x*A)/(x*B)=A/B where the common filter factor "x" cancels out. This calculation corresponds with the SNR plots 303 and 307 on either side of the receive chain filtering 219 indicating that SNR remains substantially flat and generally unchanged.

Figure 6B:
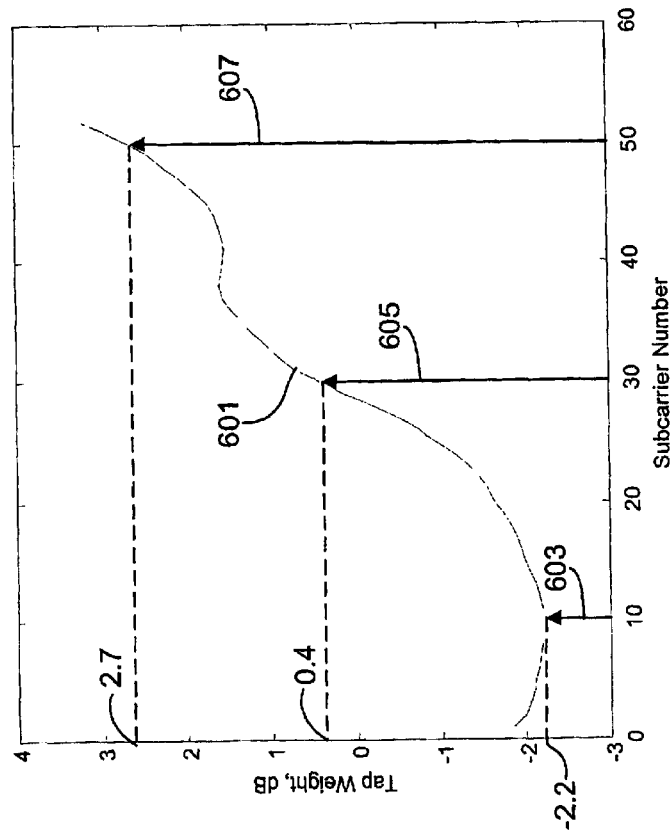
FIG. 6B is a graph diagram of a compensation curve derived from the frequency response curve of FIG. 6A.
Figure 6A:
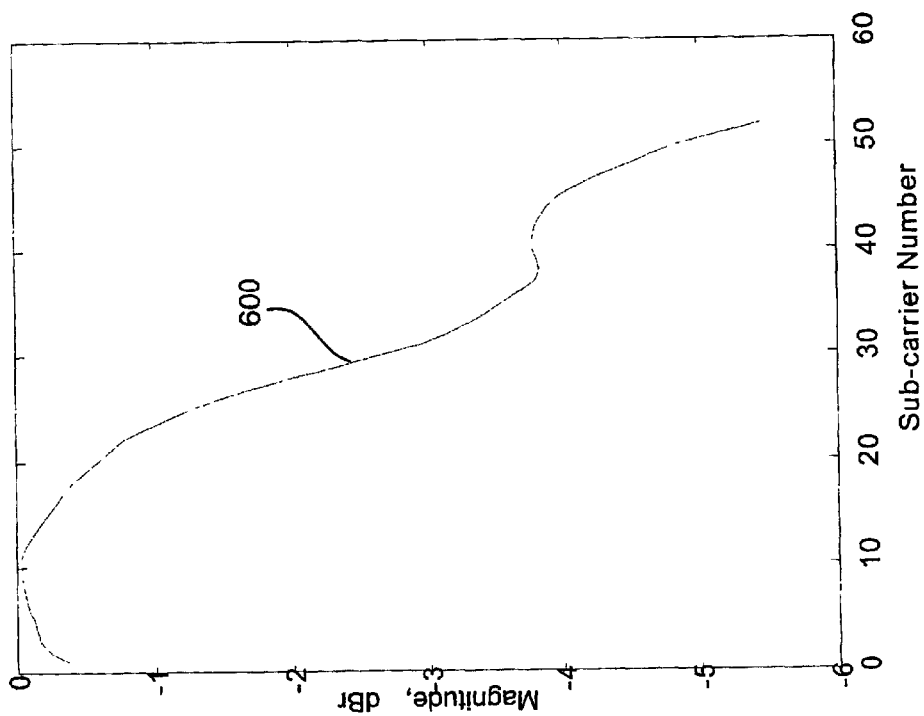
FIG. 6A is a graph diagram of an exemplary frequency response curve of the receive chain filtering of FIG. 2 as applied to the sub-carriers signals shown by sub-carrier number.

FIG. 6A is a graph diagram of an exemplary frequency response curve 600 in dBr (decibels relative to a zero level reference point) of the receive chain filtering 219 as applied to the sub-carriers signals shown by sub-carrier number. In an OFDM configuration, 52 sub-carrier signals are incorporated within each OFDM symbol, including 48 data tones and 4 pilot tones as previously described. Each sub-carrier is centered at a different frequency, so that the sub-carrier number along the horizontal axis (x-axis) reflects frequency. The normalized magnitude in dBr is plotted along the vertical axis (y-axis). The frequency response curve 600 illustrates a variation in signal magnitude between 0 and 6 dB across the sub-carriers. The higher numbered sub-carrier signals (at higher frequencies) are generally attenuated by a greater amount. The frequency response curve 600 is also referred to as Channel State Information (CSI).

FIG. 6B is a graph diagram of a compensation curve 601 derived from the frequency response curve 600. The compensation curve 601 is plotted as tap weight compensation in dB versus sub-carrier signal number and is derived by inverting the frequency response curve 600 caused by the receive chain filtering 219. For example, tap numbers 10, 30 and 50, shown at 603, 605 and 607, respectively, have compensation offsets of −2.2, 0.4 and 2.7 dB, respectively, to compensate for frequency variations of the sub-carriers relative to 0 dB. As described further below, the compensation curve 601 is used to determine compensation values that are applied to adjust frequency domain equalizer (FEQ) coefficients in the receive processor 121. In one embodiment, the compensation values are compensation factors that are multiplied by corresponding frequency response values obtained using synchronization data, such as short syncs and/or long syncs as further described below. Alternatively, the compensation values may be offsets that are added to or subtracted from corresponding frequency response values. A receiver FEQ 705 (FIG. 7) is located prior to soft decision processing so that the Soft Decision (SD) coefficients are scaled by a CSI compensation vector derived from the compensation curve 601. The resulting SD scale becomes a more accurate approximation of SNR.

Figure 7:
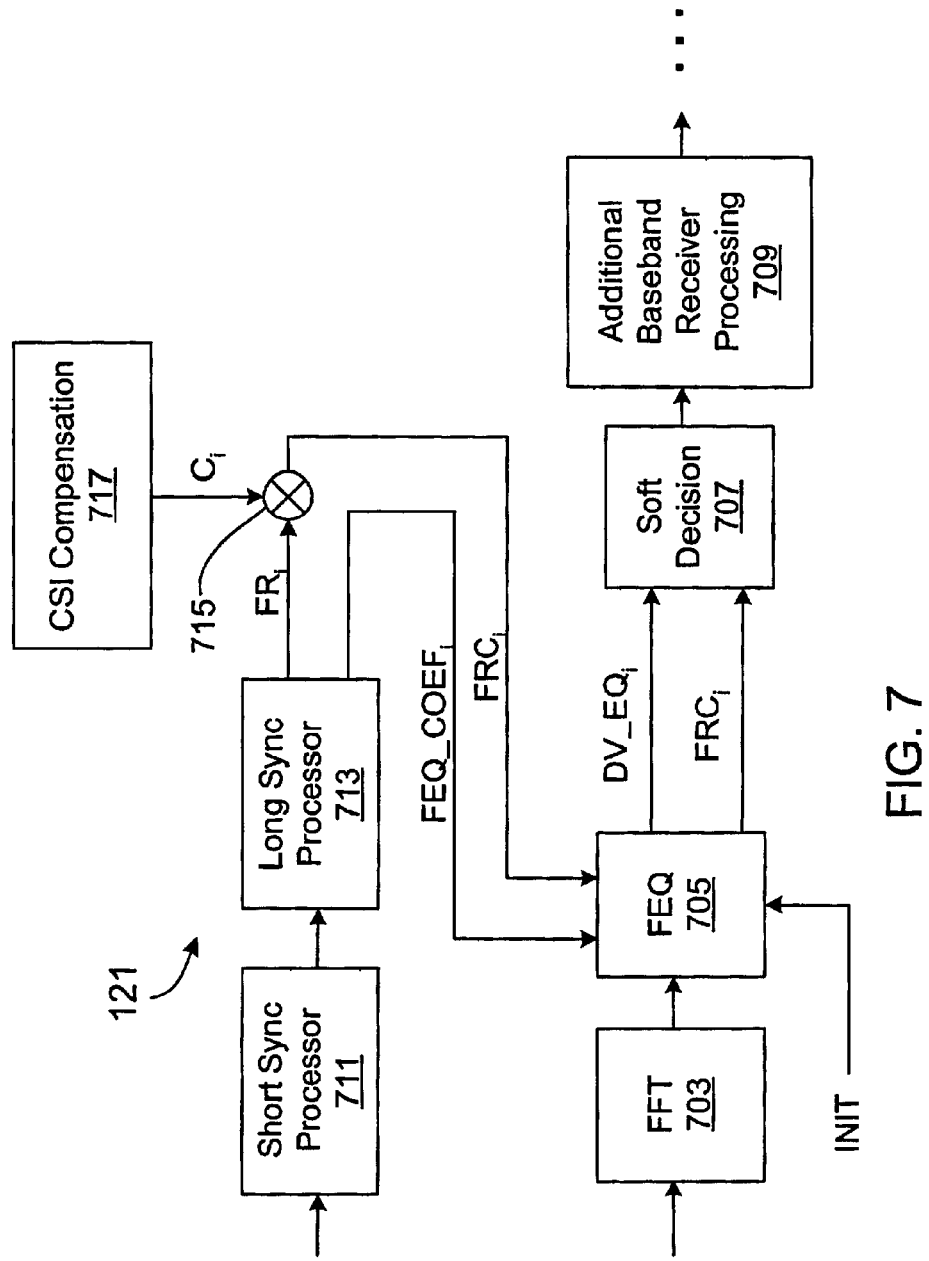
FIG. 7 is a simplified block diagram of an exemplary embodiment of the RX processor of FIG. 1.

FIG. 7 is a simplified block diagram of an exemplary embodiment of the RX processor 121. Signals from the radio 105 are converted to digital values by the ADC 223 and are provided to the receive processor 121 of the Baseband processor 107. Within the receive processor 121, the digital signals are eventually provided to a Fast-Fourier Transform (FFT) converter 703, which converts time domain signals into corresponding frequency domain signals. Typical FFT converters 703 employed for WLAN applications based on OFDM processing divide the signal into 64 separate frequency signals or tones. The outputs of the FFT converter 703 are provided to the FEQ 705, which attempts to remove phase and amplitude variations for the 52 tones originally transmitted. The 52 tones may be centered within the 64 frequency ranges of the FFT converter 703. Each tone is a complex value including real and imaginary (I,Q) components corresponding to a constellation point of a selected constellation employed for the applicable data rate. Thus, for each symbol of an incoming packet, the FEQ 705 includes a plurality of "taps" that equalize the constellation points from each data tone. As described further below, the taps of the FEQ 705 are reprogrammed at the beginning of each new packet using synchronization data. The synchronization data is provided by a long sync processor 713, which asserts frequency domain equalizer coefficient signals FEQ_COEF$_i$, where the subscript "i" denotes the respective sub-carriers or tones of each symbol. The FEQ 705 outputs a corresponding equalized data value DV_EQ$_i$ for each tone of each symbol of an incoming packet. The FEQ 705 also incorporates magnitude information for each symbol tone indicative of the relative quality of the corresponding data value. The FEQ 705 also outputs a corresponding CSI-compensated frequency response value FRC$_i$ for each DV_EQ$_i$ equalized data value. The FRC$_i$ values are also derived from frequency response data from the long sync processor 713, except that the FRC$_i$ values are compensated for receive chain filtering 219 as further described below. The FRC$_i$ values are also reprogrammed at the beginning of each new packet and are reused for each symbol of each packet.

The DV_EQ$_i$ equalized data values and FRC$_i$ values from the FEQ 705 are provided to a soft decision generator 707, which attempts to identify the particular constellation point for each tone or which attempts to identify which bits were transmitted on the corresponding tone depending upon the particular configuration. The soft decision generator 707 makes bit soft decisions based on the DV_EQ$_i$ equalized data values for each tone of the symbol. The soft decision generator 707 then weights each decision based on the corresponding FRC$_i$ value. In general, the larger the frequency response magnitude, the more accurate the data decision. It is noted that in prior designs the frequency response of each sub-carrier observed at the output of the FEQ was considered valid even though based on the assumption that the noise power across the bandwidth was flat. Thus, a sub-carrier signal attenuated by the receive chain filtering 219 was considered less reliable regardless of its corresponding SNR. The sub-carrier power signal 415, for example, would otherwise be considered less reliable than the other sub-carrier signals 405 even though its SNR is substantially the same. The $FRC_i$ values from the FEQ 705, however, are compensated to remove this error. The outputs of the soft decision generator 707 are provided to additional receiver baseband processing functions 709 that are not further described, such as a de-interleaver, a de-puncture block, a Viterbi decoder, etc.

The transmitted signal includes a preamble or the like including one or more predetermined or otherwise known synchronization data fields used for purposes of synchronization. The receive processor 121 uses the information to determine the effects of the channel and to program the FEQ 705 accordingly. For example, in one embodiment, each transmitted signal includes one or more short synchronization fields or "short syncs", which are provided to a short sync processor 711. The short sync processor 711 determines and removes a course frequency and/or phase offset from a set of samples transmitted as short syncs. The short syncs are followed by one or more long syncs (e.g. 2 long syncs), which are examined by the long sync processor 713. The long sync processor 713 uses the long syncs to more accurately identify the channel distortion applied to the known transmitted signal and to program the taps of the FEQ 705 accordingly. In one embodiment, for example, the long sync processor 713 normalizes the signal and removes phase offsets, determines signal rotations, and corrects amplitude variations to generate the set of complex value frequency response coefficient $FEQ\_COEF_i$ signals provided to program the taps of the FEQ 705. The long sync processor 713 also identifies the frequency response for each tone and provides corresponding $FR_i$ magnitude signals representing the strength of the signal at each tone.

The $FR_i$ magnitude signals from the long sync processor 713 would normally be provided directly to the FEQ 705. Instead, however, the $FR_i$ signals are provided to respective inputs of a set of multipliers 715, which receive a corresponding set of frequency response compensation values $C_i$ from a CSI compensation block 717. In the embodiment shown, the CSI compensation block 717 incorporates a compensation vector comprising the set of compensation factors $C_i$ for modifying the $FR_i$ signals to achieve CSI compensation. In an alternative embodiment, the CSI compensation values $C_i$ are offset values in which the multipliers 715 are replaced by an adder or the like for applying the offsets. In either case, the CSI compensation values $C_i$ are derived or otherwise determined from the compensation curve 601 in order to compensate for the distortions generated by the receive chain filtering 219. An initialization signal INIT is provided to the FEQ 705 for programming its taps when the $FEQ\_COEF_i$ and $FRC_i$ signals are determined and stabilized.

As described previously, the CSI compensation values may be predetermined, such as at the time of manufacture of the integrated circuits (ICs) or chips embodying the receive processor 121, and programmed into a memory. The memory storing the CSI compensation values may be separately provided or incorporated on the chip or implemented in firmware as known to those skilled in the art. The CSI compensated frequency response output signals $FRC_i$ from the multipliers 715 are then stored within the FEQ 705 and provided to the soft decision generator 707 at the appropriate time. In this manner, the soft decision metrics of the soft decision generator 707 are CSI-compensated so that the decisions are more accurate.

Figure 8:
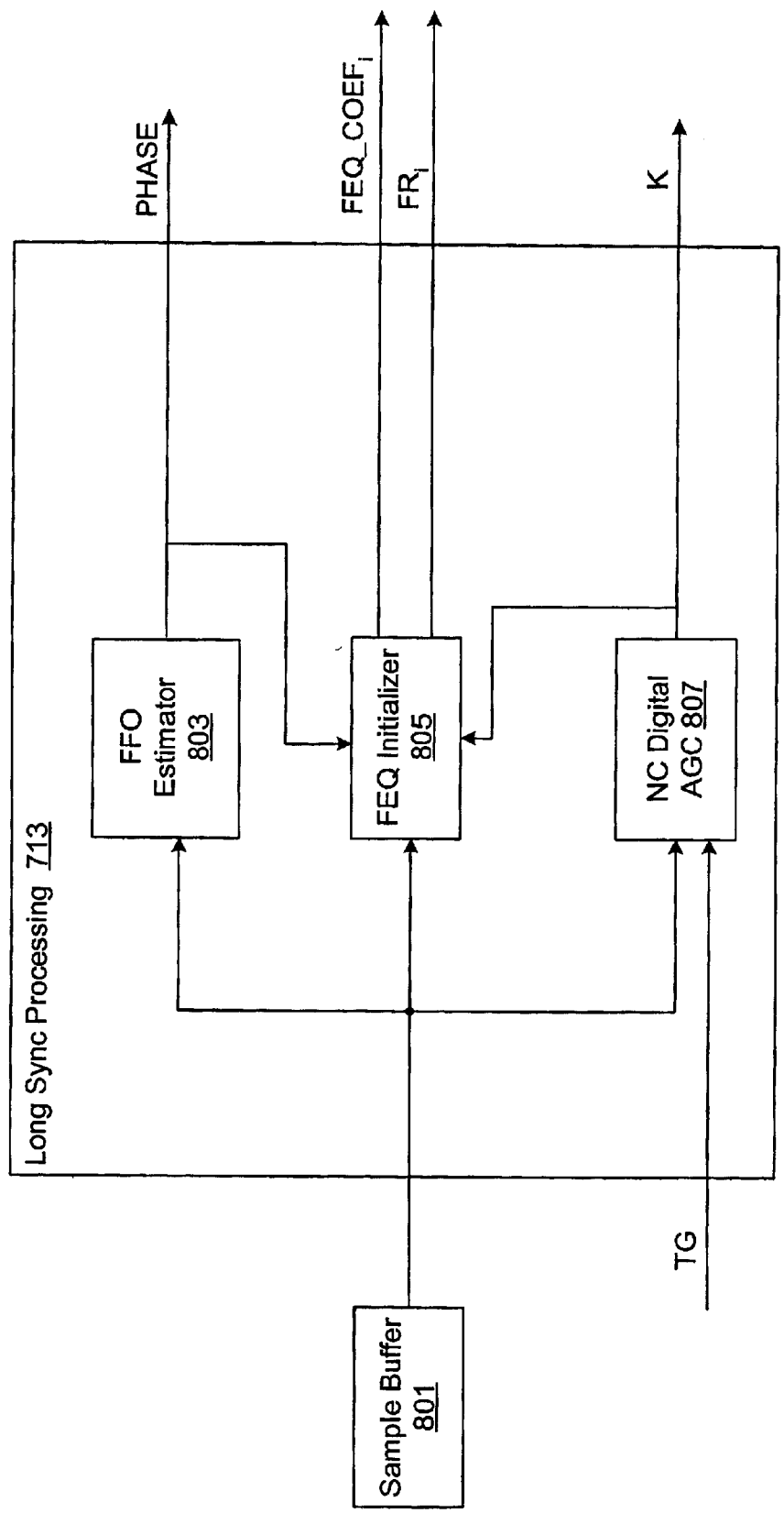
FIG. 8 is a more detailed block diagram of the long sync processor of FIG. 7.

FIG. 8 is a more detailed block diagram of the long sync processor 713. Sync data is provided from the short sync processing block 711 via a sample buffer 801 or the like. Additional control and status signals are included but not shown as not relevant for purposes of the present invention. The sync data is provided to a Fine Frequency Offset (FFO) Estimator 803, an FEQ Initializer 805 and a non-coherent (NC) Digital Automatic Gain Control (AGC) 807. The FFO Estimator 803 performs additional and more accurate phase adjustment and asserts one or more "PHASE" signals to the FEQ Initializer 805. The NC Digital AGC 807 compares the sync data with a Target Gain (TG) signal and asserts a gain adjust signal K to the FEQ Initializer 805. The long sync processor 713 operates according to the selected data rate and the corresponding constellation. Thus, the FEQ Initializer 805 employs the selected constellation, the PHASE adjustment signals and the K gain adjustment signals in an attempt to determine the channel effects and distortion applied to the known sync data for purposes of programming the FEQ 705. The FEQ Initializer 805 removes rotation and corrects amplitude variations to provide the complex $FEQ\_COEF_i$ signals to program the FEQ 705. In one embodiment, the FEQ Initializer 805 normalizes the sync data signals and removes phase effects for each of the tones. The FEQ Initializer 805 also determines the frequency response and generates a magnitude element for each tone as reflected by frequency response signals $FR_i$. The $FR_i$ signals are magnitude values of the signals processed through the receive chain filtering 219 that are intended to reflect the strength of the signal at each tone frequency and intended to be used to determine the corresponding quality of the soft decision. As previously described, however, the $FR_i$ signals are converted to the $FRC_i$ signals for a more reliable measure of the strength and quality of corresponding data values embodied as the $DV\_EQ_i$ signals.

It is appreciated that knowledge of the receive chain frequency response is used to improve the SNR estimate for sub-carriers of an RF signal, such as a radio system using OFDM. In one embodiment, the frequency response of the receive chain filtering 219 is measured for precise compensation. Alternatively, the frequency response of the receive chain filtering 219 is approximated to achieve a realizable solution for most radio designs. A simulation was conducted to measure performance enhancement employing CSI compensation according to the present invention. Performance was measured based on the amount of energy required to achieve a performance point. The selected performance point is 10 percent packet error rate (PER) plotted against energy per bit versus noise, or "EbNo". A 0.5 dB improvement was achieved for a data rate of 54 Mbps in an Additive White Gaussian Noise (AWGN) channel at 10 percent packet error rate (PER). A 1.0 dB improvement was achieved for a data rate of 54 Mbps with 100 nanosecond (ns) delay spread simulating a multi-path channel at 10 percent PER.

The performance data illustrates that a system employing CSI-compensation according to an embodiment of the present invention can receive a signal at the same level of reliability when farther from the transmitter as compared to a system without compensation. In this manner, the corresponding WLAN system can reliably cover a larger wireless area. Also, for a given area, the transmitter of a WLAN system using CSI-compensation may transmit using less power than a WLAN system that does not use CSI-compensation. In this manner, longer battery life may be achieved for battery-powered wireless devices.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention.

What is claimed is:

1. A wireless receiver that receives radio frequency (RF) signals via a wireless channel in which data is transmitted using a plurality of sub-carriers, comprising:
   a receive chain;
   a synchronization processor that determines a frequency response of the wireless channel using synchronization data;
   a memory that stores a compensation vector indicative of a frequency response of the receive chain;
   a combiner that combines the compensation vector with the wireless channel frequency response to provide a compensated frequency response; and
   a soft decision processor that uses the compensated frequency response to evaluate data decisions.

2. The wireless receiver of claim 1, wherein the receive chain includes a plurality of filtering circuits that collectively have a variant frequency response and a relatively flat signal to noise ratio (SNR).

3. The wireless receiver of claim 2, wherein the compensation vector is based on a measurement of the variant frequency response of the receive chain.

4. The wireless receiver of claim 2, wherein the compensation vector is based on an estimation of the variant frequency response of the receive chain.

5. The wireless receiver of claim 2, wherein the compensation vector is based on a compensation curve derived from the variant frequency response of the receive chain.

6. The wireless receiver of claim 2, wherein the compensation vector corrects for variations in the variant frequency response of the receive chain across the plurality of sub-carriers.

7. The wireless receiver of claim 1, wherein:
   the compensation vector comprises a plurality of compensation factors; and
   wherein the combiner comprises a plurality of multipliers.

8. The wireless receiver of claim 1, wherein:
   the compensation vector comprises a plurality of compensation offsets; and
   wherein the combiner comprises a plurality of adders.

9. The wireless receiver of claim 1, further comprising:
   a frequency domain equalizer (FEQ) having programmable taps for equalizing each of the plurality of sub-carriers in an attempt to remove phase and amplitude variations;
   the FEQ receiving compensated frequency response values and providing an equalized data value and a corresponding compensated frequency response value for each sub-carrier to the soft decision processor;
   the synchronization processor generating FEQ coefficients used to program the taps of the FEQ and generating receive chain frequency response values that are provided to the combiner; and
   the combiner receiving the receive chain frequency response values and providing corresponding compensated frequency response values to the FEQ.

10. A radio frequency (RF) transceiver for communicating via a wireless channel, comprising:
    an antenna;
    a radio including receive chain circuitry coupled to the antenna that converts received RF packets into Baseband information;
    a Baseband processor, coupled to the radio, including a receive processor for processing the Baseband information, the receive processor comprising:
      a synchronization processor that determines a plurality of frequency response values using synchronization data transmitted via the wireless channel;
      a memory that stores a plurality of compensation values indicative of a frequency response of the receive chain circuitry;
      a combiner that modifies the plurality of frequency response values using the plurality of compensation values to provide a plurality of compensated frequency response values; and
      a soft decision processor that uses the plurality of compensated frequency response values to evaluate decisions of corresponding data values.

11. The RF transceiver of claim 10, wherein the receive chain circuitry includes a plurality of filtering and down conversion circuits that collectively have a variant frequency response and a relatively flat signal to noise ratio (SNR).

12. The RF transceiver of claim 11, wherein the plurality of compensation values are based on a compensation curve derived from the variant frequency response of the receive chain circuitry.

13. The RF transceiver of claim 12, wherein the plurality of compensation values correct for variations in the variant frequency response of the receive chain circuitry for each of a plurality of sub-carriers.

14. The RF transceiver of claim 10, wherein:
    the plurality of compensation values comprise a plurality of frequency response compensation factors; and
    wherein the combiner comprises a plurality of multipliers.

15. The RF transceiver of claim 10, wherein:
    the plurality of compensation values comprise a plurality of frequency response compensation offsets; and
    wherein the combiner comprises a plurality of adders.

16. The RF transceiver of claim 10, further comprising:
    an analog to digital converter (ADC) that converts the Baseband information from analog to digital format for processing by the receive processor;
    the receive processor comprising:
      a frequency transform converter that converts time domain Baseband digital information into frequency domain Baseband digital information; and
      a frequency domain equalizer (FEQ) having programmable taps for equalizing the frequency domain Baseband digital information in an attempt to remove phase and amplitude variations for each of a plurality of sub-carriers, the FEQ receiving the plurality of compensated frequency response values and providing an equalized data value and a corresponding compensated frequency response value for each of the plurality of sub-carriers to the soft decision processor;
    wherein the synchronization processor generates FEQ coefficients used to program the taps of the FEQ and generates receive chain circuitry frequency response values that are provided to the combiner; and
    wherein the combiner receives the receive chain frequency response values and provides corresponding compensated frequency response values to the FEQ.

17. The RF transceiver of claim 16, wherein the synchronization processor further comprises:
    a frequency offset estimator that determines phase adjustment and asserts phase adjustment signals indicative thereof;

a gain adjust circuit that compares the synchronization data with a target gain signal and asserts gain adjustment signals indicative thereof; and an FEQ initializer that employs a selected constellation and that receives the phase adjustment signals and the gain adjustment signals to provide the FEQ coefficients in an attempt to remove rotation and correct amplitude variations caused by the wireless channel, the FEQ initializer further determining a frequency response of the wireless channel and providing the plurality of frequency response values indicative thereof.

18. A method of compensating channel state information for a wireless receiver that receives radio frequency (RF) signals via a wireless channel in which data is incorporated on a plurality of sub-carriers and in which the receiver employs soft decision processing, comprising:

determining a frequency response of the wireless channel based on synchronization data transmitted in the wireless channel;

modifying the frequency response by a compensation vector indicative of filtering of the receive chain to provide a corresponding compensated frequency response;

processing data received from the wireless channel through the receive chain to provide estimated data values; and determining quality of data value decisions based on the compensated frequency response values.

19. The method of claim 18, further comprising:

measuring a frequency response of the receive chain;

inverting the measured frequency response; and determining the compensation vector based on the inverted frequency response.

20. The method of claim 18, further comprising:

approximating a frequency response of the receive chain;

inverting the approximated frequency response; and determining the compensation vector based on the inverted frequency response.

21. The method of claim 18, wherein the compensation vector comprises a plurality of compensation factors, wherein the frequency response comprises a plurality of frequency response values, and wherein said modifying comprises multiplying each of the compensation factors by a corresponding one of the frequency response values.

22. The method of claim 18, wherein the compensation vector comprises a plurality of compensation offsets, wherein the frequency response comprises a plurality of frequency response values, and wherein said modifying comprises adding each of the compensation offsets by a corresponding one of the frequency response values.

23. The method of claim 18, further comprising:

determining frequency equalizer (FEQ) coefficients using the synchronization data;

programming an FEQ based on the FEQ coefficients;

processing data from the receive chain through the FEQ to provide equalized data values; and making data value decisions based on the equalized data values.

* * * * *